United States Patent [19]

Roberts

[11] Patent Number: 4,912,994
[45] Date of Patent: Apr. 3, 1990

[54] LINKAGE DEVICE
[75] Inventor: John E. Roberts, Los Altos, Calif.
[73] Assignee: GTE Government Systems Corporation, Stamford, Conn.
[21] Appl. No.: 319,373
[22] Filed: Mar. 6, 1989
[51] Int. Cl.[4] .............................................. F16H 21/44
[52] U.S. Cl. ....................................... 74/96; 74/99 R; 74/89.15
[58] Field of Search .................... 74/89.14, 89.15, 105, 74/96, 99 R, 89 R, 101

[56] References Cited

U.S. PATENT DOCUMENTS

| | | | |
|---|---|---|---|
| 2,311,972 | 2/1943 | Simpson | 74/89.15 |
| 2,661,012 | 12/1953 | Militano | 74/96 |
| 2,713,178 | 7/1955 | Stocks | 74/99 R |
| 3,253,473 | 5/1966 | Chisholm | 74/96 |
| 3,263,515 | 8/1966 | Adamski | 74/105 |
| 3,263,516 | 8/1966 | Chisholm | 74/105 |
| 3,449,971 | 6/1969 | Posh | 74/89.14 |
| 4,271,711 | 6/1981 | Vavra | 74/99 R |
| 4,441,376 | 4/1984 | Tobey | 74/89.15 |
| 4,580,436 | 4/1986 | Nelson | 74/96 |
| 4,821,596 | 4/1989 | Eklund | 74/89.15 |

Primary Examiner—Kenneth J. Dorner
Assistant Examiner—Gerald A. Anderson
Attorney, Agent, or Firm—Douglas M. Gilbert; John F. Lawler

[57] ABSTRACT

A linkage device connectable between adjacent ends of a tubular support member and payload member is adapted to rotate the payload member through approximately 180° about the end of the support member between inoperative and operative positions by movement of an actuating rod longitudinally within the tubular member. The linkage device comprises first and second frames secured to adjacent ends of the members and four bars pivotally connected at opposite ends to corners of the frames, the first pair of bars extending within the frames and the second pair extending outside the frames. The actuating rod is connected to the first pair of bars and rotates them about their pivotal connection to the first frame when the rod is moved longitudinally within the tubular member. Both pairs of bars cause the payload member to rotate about the end of the support member through 180° and into an operative position in longitudinal alignment with the support member.

10 Claims, 5 Drawing Sheets

LINKAGE DEVICE

BACKGROUND OF THE INVENTION

This invention relates to pivotable linkage devices and more particularly to such a linkage device that is capable of pivoting a supported member, such as a payload, between stowed and operating positions on the end of a supporting member.

The use of communications and various electronic and optical equipment, herein referred to as payloads, in hostile military environments often requires erecting antennas and the like as high as 20 meters or more above ground in order to facilitate transmission and reception of signals to and from distant locations. A telescopic mast useful for deploying such payloads is described in U.S. application Ser. No. 246,112. During such deployment, the payload is moved from a stowed position, usually offset from the mast axis, to an operative position extending outwardly from and axially aligned with the mast. To facilitate rapid deployment, the payload may be pivotally connected to the end of the mast tube by a linkage device.

Prior linkage devices of this type usually have a single pivot point hinge or a rotator mechanism that keeps the payload axis offset from the mast tube axis after deployment. The single pivot point hinge requires gear reduction apparatus that is heavy and also needs separate braking/locking devices, all of which are costly. The problem with the offset axis design is that it tends to eccentrically load the whole system. Eccentric loading exaggerates deflections and results in an inherently weaker design. In addition to this, the deploying axis swings horizontally about a vertical axis to position the load. While this precludes the need for a large gear box, it requires a considerable amount of horizontal room, thereby eliminating its use in applications where horizontal space is absent or limited.

This invention is directed to a linkage device which eliminates and avoids these difficulties and disadvantages.

OBJECTS AND SUMMARY OF THE INVENTION

A general object of the invention is the provision of a linkage device which permits rotation of a payload approximately 180° about the end of a supporting member.

Another object is the provision of such a device that is self-locking, that is, requires no separate locking mechanism.

A further object is the provision of such a device that is light in weight, simple in construction, and inexpensive to make.

Still another object is the provision of such a device with a structure that readily permits selection of a mechanical advantage suitable to accommodate the weight of the payload and the available motor torque.

These and other objects are achieved with a linkage device comprising two frames on adjacent ends, respectively, of the supporting and supported members, each frame having two pivots respectively spaced remotely from and closer to the associated member. a set of bars interconnects the remote pivot of one frame with the closer pivot on the other, and another set of bars connects the closer pivot of said one frame with the remote pivot of said other frame. A self-locking jack screw mechanism on the supporting member engages the associated set of bars so that longitudinal movement of the screw relative to the supporting member causes rotation of the supported member about the end of the supporting member.

DESCRIPTION OF PREFERRED EMBODIMENTS

Figure 2:
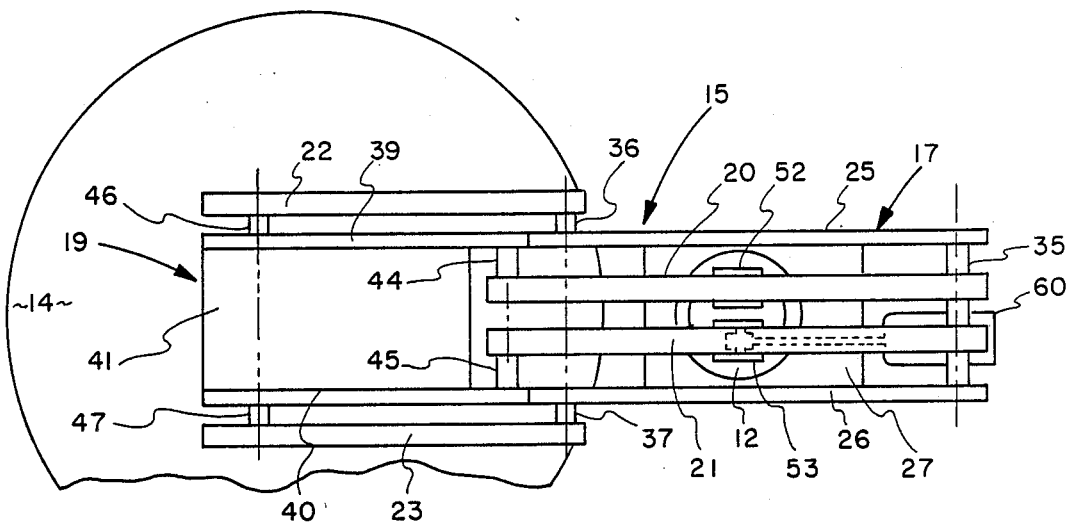
FIG. 2 is a top view of the linkage device viewed along line 2—2 of FIG. 1.
Figure 1:
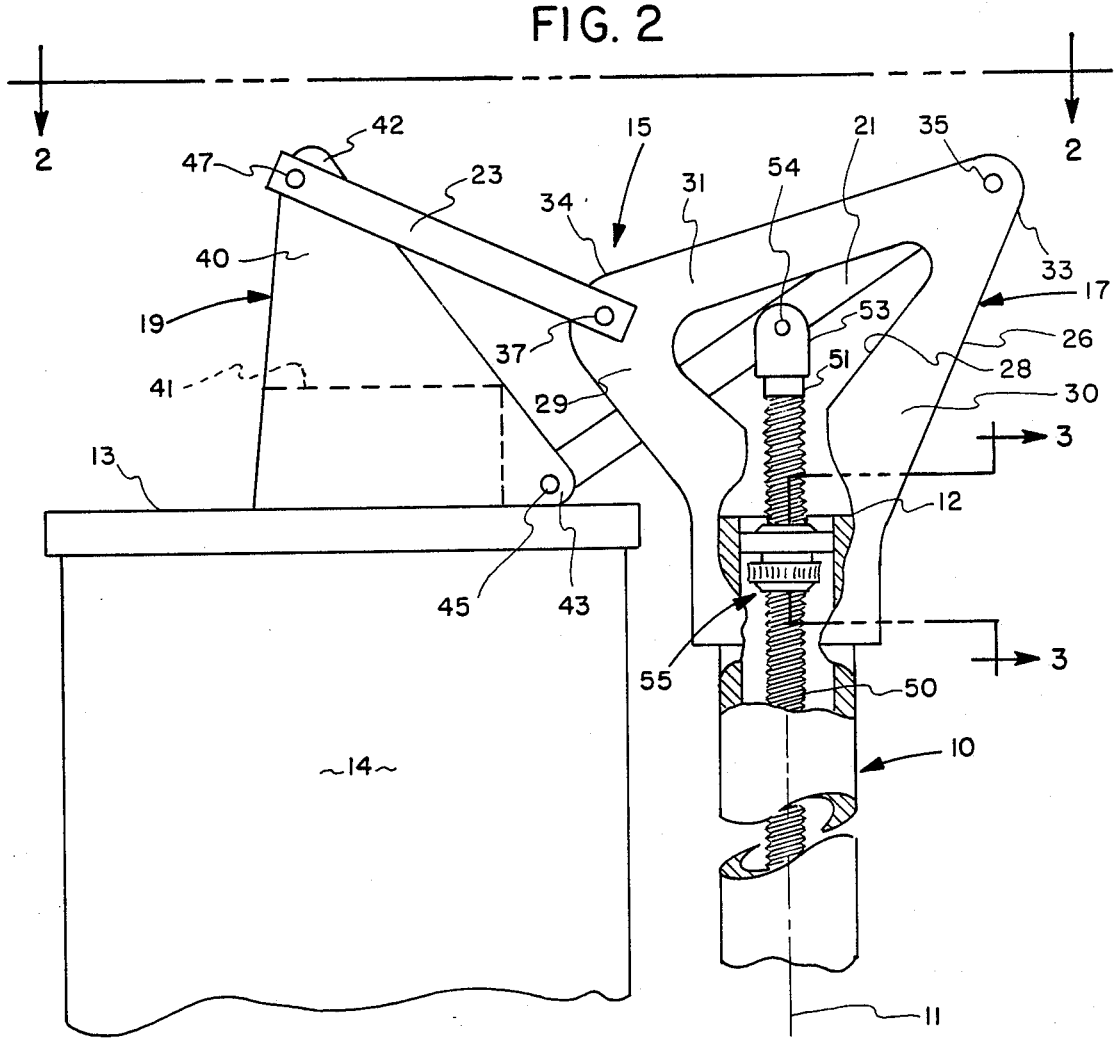
FIG. 1 is an elevation of the linkage device of this invention interconnecting a supporting tube and a payload in an inoperative or stowed position.
Figure 6:
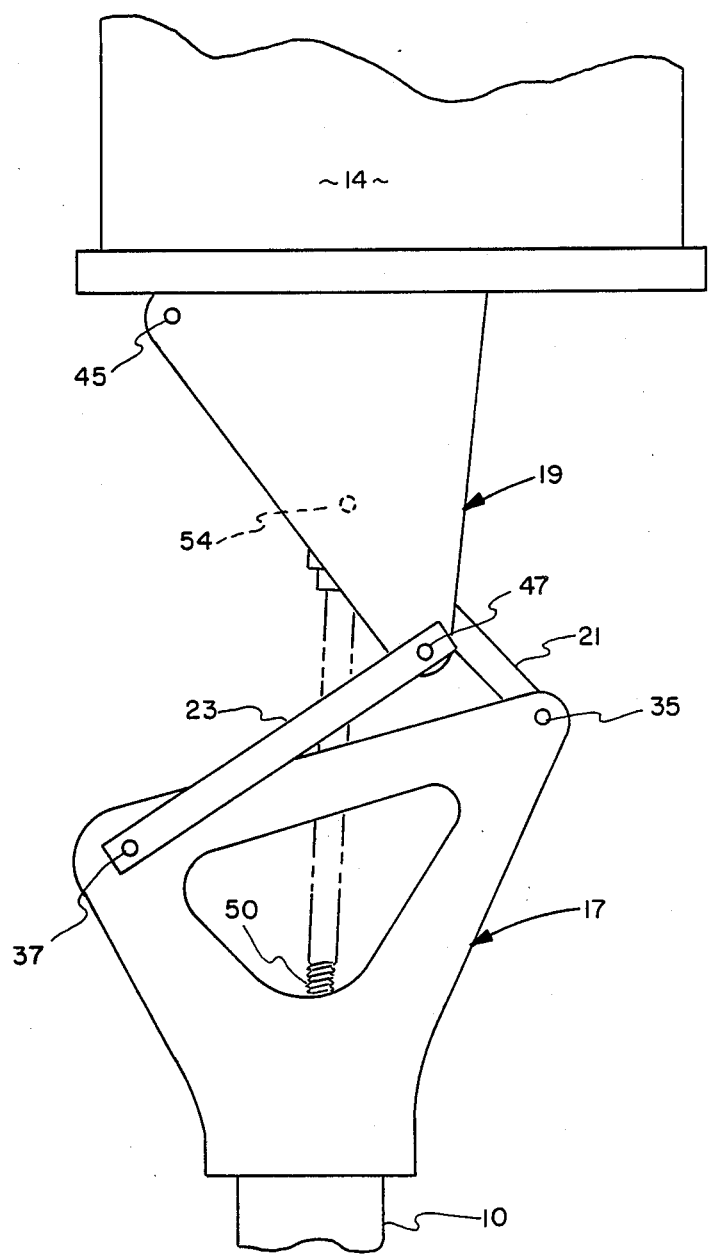

Referring now to the drawings, FIGS. 1 and 2 show a supporting member 10 such as a mast tube having an axis 11, the upper end 12 of which tube is connected to an adjacent end 13 of a supported member or payload 14 by linkage device 15. By way of example, tube 10 may be an extendible mast of the type described in application Ser. No. 246,112 and payload 14 may be an antenna. Linkage device 15 serves to support and to move or rotate payload 14 through approximately 180° from an inoperative position offset from tube end 12 as shown in FIG. 1 to an operative position above and axially aligned with tube 10 as shown in FIG. 6.

Linkage device 15 comprises a frame 17 secured to end 12 of tube 10, another frame 19 secured to the end 13 of payload 14, and a first pair of bars 20 and 21, see FIG. 2, and a second pair of bars 22 and 23 pivotally interconnecting frames 17 and 19. Frame 17 has substantially identical laterally spaced parallel side plates 25 and 26 secured together at their lower ends by a spacer block 27 connected thereto. Each of plates 25 and 26 has a substantially triangularly shaped central opening to facilitate assembly, one of which is shown at 28 in FIG. 1, above spacer block 27, and upwardly and outwardly diverging arms 29 and 30 connected at their outer ends by a cross arm 31. Alternatively, plates 25 and 26 without central openings may be used. Outer corners 33 of plate 25 and 26 are spaced remotely from end 12 of tube 10 and from frame 19. Inner corners 34 of plates 25 and 26 are spaced more closely to tube end 12 and are proximate to frame 19. First bars 20 and 21 have a pivotal connection to the insides of plates 25 and 26, respectively, at remote outer corners 33 thereof by pin 35. Second bars 22 and 23 have a pivotal connection by pins 36 and 37 to the outsides of inner corners 34 of plates 25 and 26, respectively.

Frame 19 comprises a pair of parallel substantially identical triangularly-shaped side plates 39 and 40 secured to the end 13 of payload 14 by a spacer block 41 and projecting outwardly (upwardly, as viewed in FIG. 1) therefrom. Each of plates 39 and 40 have an outer corner 42 remote from payload end 13 and from frame 17 and an inner corner 43 proximate to payload end 13 and proximate to frame 17. The ends of first bars 20 and 21 opposite from their pivotal connection to frame 17 have a pivotal connection to the insides of plate corners 43 of frame 19 by pivot pins 44 and 45. Second bars 22 and 23 have a pivotal connection to the outsides of corners 42 of plates 39 and 40 by means of pins 46 and 47.

In order to actuate linkage device 15, a jack screw 50 is disposed within and extends from the top of tube 10 for pivotal connection to the central part of first bars 20 and 21. The upper (as viewed in FIG. 1) end of screw 50 rests in a journal socket 51 which is secured to U-shaped clamps 52 and 53 which in turn have pivotal connections, one of which is shown at 54, to the central portions of bars 20 and 21, respectively. Screw 50 is movable longitudinally relative to tube 10 and through its connection to bars 20 and 21 causes linkage device 15 to rotate payload 14 about upper end 12 of tube 10.

Figure 3:
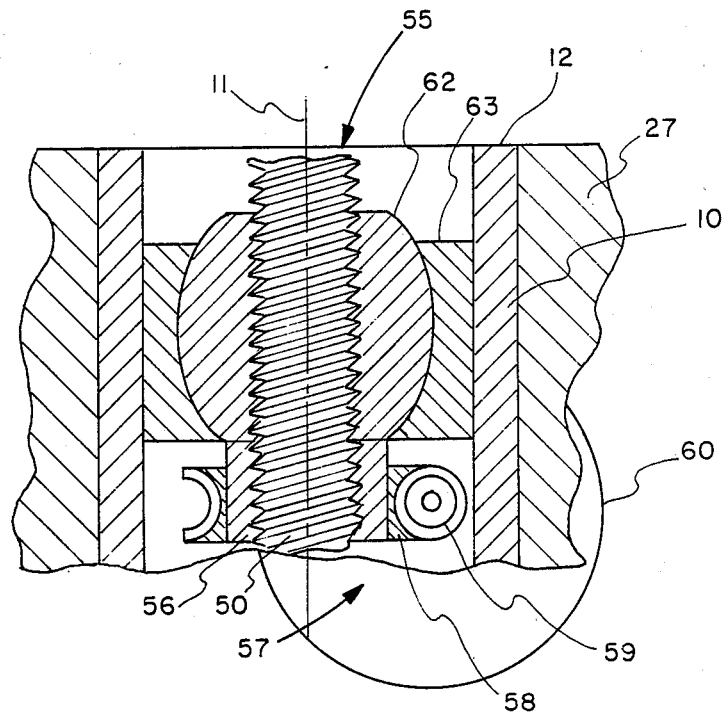
FIG. 3 is a greatly enlarged section taken on line 3—3 of FIG. 1.

In order to move screw 50 longitudinally within tube 10, a nut assembly 55, see FIG. 3, is mounted within and is secured to the upper end portion of tube 10. Assembly 55 comprises a nut 56 engaging the threads of screw 50 and driven by a worm gear 57 consisting of a worm wheel 58 engaged by a worm 59, the latter being rotated by a reversible motor 60. Nut assembly 55 also includes a spherical bearing or journal 62 secured to nut 56 and threadedly engaging screw 50, and a journal box 63 secured to the interior of tube 10 and having a spherical bearing surface 64 engaging journal 62. Motor 60 rotates nut 56 and journal 62 which moves screw 50 longitudinally within tube 10 while journal 62 permits the axis of screw 50 along with motor 60 and worm gear 57 to rotate to accommodate axial displacement of the connections of clamps 52 and 53 to bars 20 and 21, respectively. Principal advantages of this drive arrangement are that it is self-locking and is conveniently located for maintenance.

Figure 4:
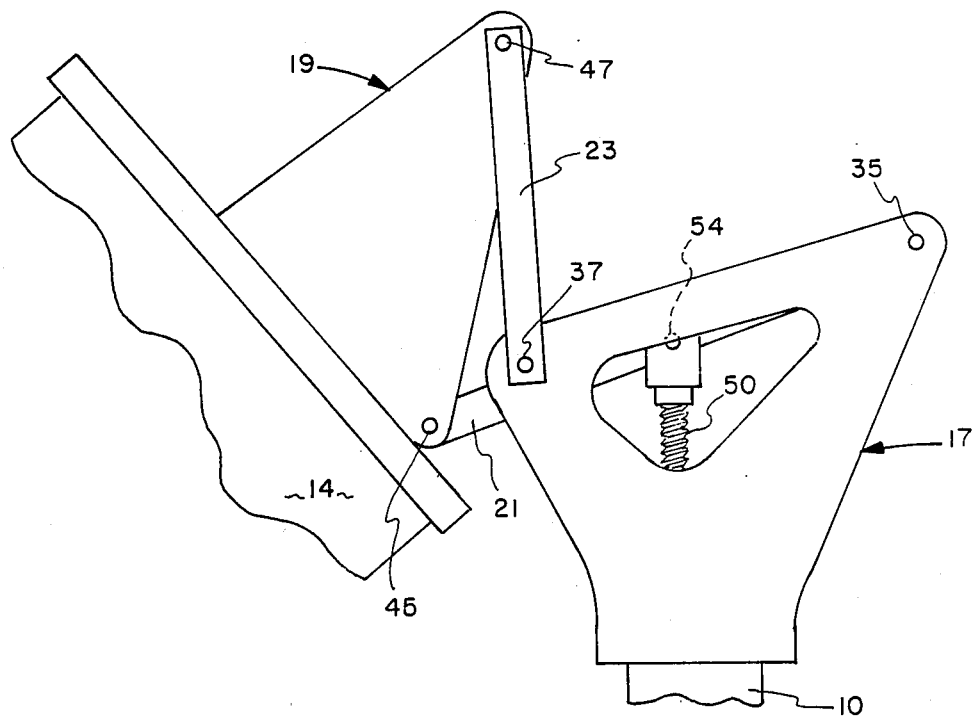
FIGS. 4–6, inclusive, are elevations of the linkage device similar to FIG. 1 but at different angles of rotation of the payload between the stowed and operative positions and at the operative position (FIG. 6).
Figure 5:
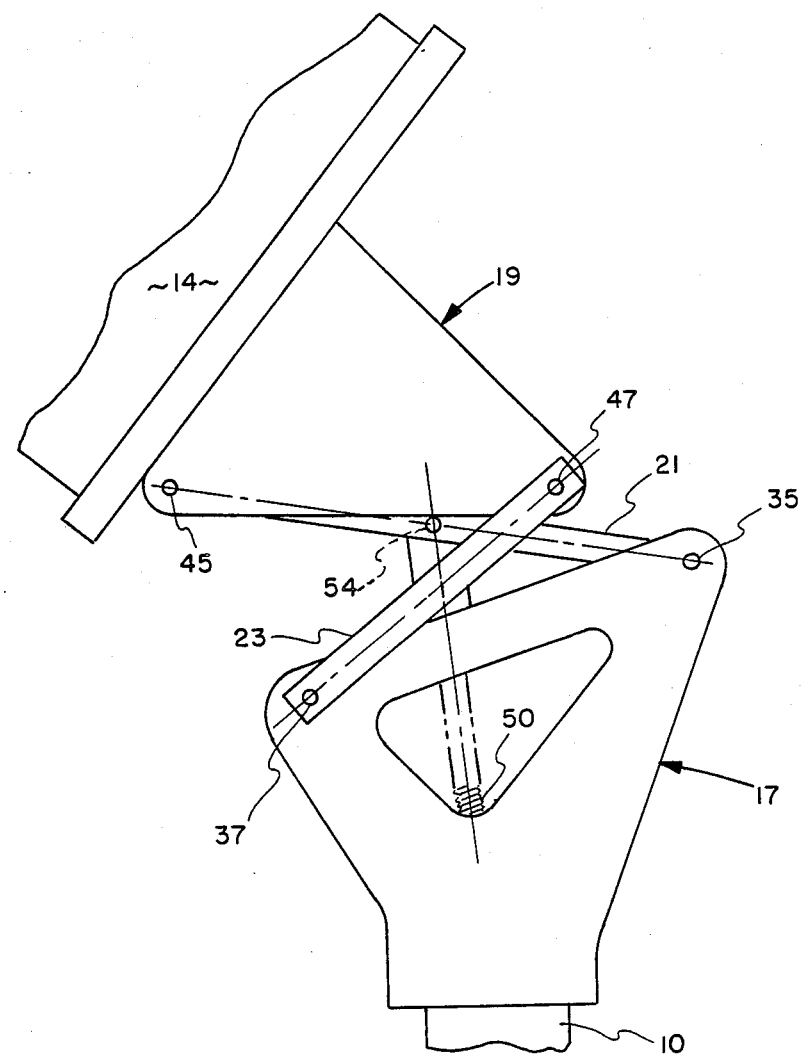

As shown in FIGS. 4, 5 and 6, longitudinal extension of screw 50 from tube 10 by nut assembly 55 causes bars 20 and 21 to pivot clockwise about their pivotal connection 35 to frame 17 and bars 22 and 23 to likewise pivot about their pivotal connection 47 to frame 19. By this action, payload 14 is lifted upwardly through a 180° arc about the top end 12 of tube 10 until the payload is in substantial vertical alignment with the tube as shown in FIG. 6.

Figure 7:
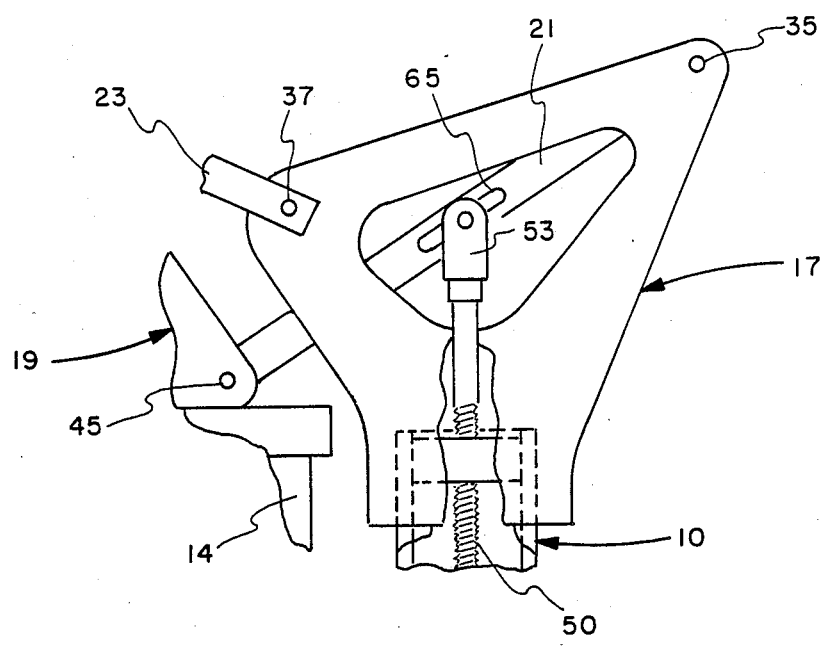
FIG. 7 is an elevation similar to FIG. 1 showing a linkage device embodying an alternate form of the invention.

An alternate form of the invention is shown in FIG. 7 in which clamps 53 on the top of screw 50 are pivotally connected to longitudinal slots, one of which is shown at 65, in bars 20 and 21, like reference characters indicating like parts in the drawings. This construction permits screw 50 to remain vertical at all times during extension and retraction thereof and accordingly simplifies the drive mechanism by eliminating the journal. The disadvantage of this arrangement is that it is not self-locking and therefore requires a separate locking mechanism on drive motor 60 or nut 56.

As noted from the foregoing description, linkage device 15 is a simple, inexpensive and lightweight structure that provides an effective mechanical coupling between supporting member 10 and payload member 14. In addition to its enumerated advantages, linkage device 15 provides an opportunity to reduce the power needed to rotate payload member 14 by selection of linkage lengths and jack screw placement that enables the jack screw to develop greater thrust during the inherently low torque portions of the deployment-stowage cycle.

While the invention has been described with reference to its preferred embodiments, it will be understood by those skilled in the art that various changes may be made and equivalents may be substituted without departing from the spirit and scope of the invention. For example, screw 50 may be rotated by a nut and motor located at the bottom end of member 10 or nut 56 may be non-rotationally mounted on member 10 tube and screw 50 may be rotated. Also different shapes of frames 17 and 19 may be used without departing from the spirit of the invention.

What is claimed is:

1. A linkage device connecting one end (12) of a first member (10) having a longitudinal axis (11) to an end (13) of a second member (14) and adapted to move said second member between a first position offset to one side of said first member and a second position in substantial longitudinal alignment with said first member, said device comprising:
    a first pair of laterally-spaced interconnected plates (25, 26) secured to and projecting outwardly from said one end of said first member;
    said first pair of plates having first and second ends (33, 34) respectively remote from and nearer to said first member (10),
    a second pair of laterally-spaced interconnected plates (39, 40) secured to and projecting outwardly from said end of the second member;
    said second pair of plates having first and second ends (42, 43) respectively remote from and nearer to said second member;
    first bar means (20, 21) having a first pivotal connection (35) between and to said first pair of plates at said first end (33) thereof; the end of said first bar means opposite from said first pivotal connection (35) having a second pivotal connection (45) to and between said second pair of plates at said second end (43) thereof;
    second bar means (22, 23) having a third pivotal connection (46, 47) to the outer sides of said second pair of plates (39, 40) at said first ends (42) thereof, the end of said second bar means (22, 23) opposite from said third pivotal connection (46, 47) having a fourth pivotal connection (36, 37) to said first pair of plates (25, 26) at said second end (34) thereof; and
    means for pivoting said first bar means (20, 21) about said first pivotal connection (35) whereby to rotate said second member approximately 180° about said one end (12) of said first member (10) between said first and said second positions.

2. The linkage according to claim 1 in which said first member comprises a tube;
    said last named means comprising an elongated rod extending through and projecting from said one end of said tube, said rod being pivotally connected to said first bar means intermediate said first and second pivotal connections of the latter; and
    means for moving said rod axially of said tube.

3. The linkage according to claim 2 in which said last named means comprises an axially fixed nut mounted on said first pair of plates and threadedly engaging said rod, and motor means for rotating said rod and said nut relative to each other.

4. The linkage according to claim 3 in which said first bar means is slotted at the pivotal connection thereof to said rod.

5. The linkage according to claim 3 in which said nut has a journal connection to said first member.

6. A linkage device connecting one end of a first member having a longitudinal axis to an end of a second member and adapted to move said second member between a first position offset to one side of said first member and a second position in substantial longitudinal alignment with said first member, said device comprising:
- a first support frame secured to and projecting outwardly from said one end of said first member; said first frame having first and second ends respectively remote from and nearer to said first member;
- a second support frame secured to and projecting outwardly from said end of the second member;
- said second frame having first and second ends respectively remote from and nearer to said second member;
- first bar means having a first pivotal connection to said first frame at said first end thereof; the end of said first bar means opposite from said first pivotal connection having a second pivotal connection to said second frame at said second end thereof;
- second bar means having a third pivotal connection to said second frame at said first end thereof;
- the end of said second bar means opposite from said third pivotal connection having a fourth pivotal connection to said first frame at said second end thereof; and
- means for pivoting said first bar means about said first pivotal connection whereby to rotate said second member approximately 180° about said one end of said first member between said first and said second positions.

7. A linkage device connecting one end of a first member having a longitudinal axis to an end of a second member and adapted to move said second member between a first position offset to one side of said first member and a second position in substantial longitudinal alignment with said first member, said device comprising:
- a first frame secured to and projecting outwardly from said one end of said first member, said first frame having first and second parts respectively remote from and nearer to said first member;
- a second frame secured to and projecting outwardly from said end of the second member, said second frame having first and second parts respectively remote from and nearer to said second member;
- first bar means having a first pivotal connection to said first frame at said first part thereof; said first bar means having a second pivotal connection to said second frame at said second part of the latter;
- second bar means having a third pivotal connection to said second frame at said first part thereof, said second bar means having a fourth pivotal connection to said first frame at said second part of the latter; and
- means for rotating said first bar means about said first pivotal connection whereby to rotate said second member approximately 180° about said one end of said first member between said first and said second positions.

8. The linkage according to claim 7 in which said first member comprises a tube:
- said rotating means comprising an elongated rod extending through and projecting from said one end of said tube, said rod being pivotally connected to said first bar means intermediate said first and second pivotal connections of the latter; and
- means for moving said rod axially of said tube.

9. The linkage according to claim 8 in which said rotating means comprises an axially fixed nut non-rotationally mounted on said tube and threadedly engaging said rod; and motor means for rotating said rod and said nut relative to each other.

10. The linkage according to claim 9 in which said first bar means is slotted at the pivotal connection thereof to said rod.

* * * * *